Aug. 23, 1966

S. L. YACKLE 3,267,792

TORQUE LIMITED HEX NUT

Filed Jan. 31, 1964

INVENTOR.
Siegfried L. Yackle
BY
Paul Fitzpatrick
ATTORNEY

United States Patent Office 3,267,792
Patented August 23, 1966

3,267,792
TORQUE LIMITED HEX NUT
Siegfried L. Yackle, Milwaukee, Wis., assignor to General Motors Corporation, Detroit, Mich., a corporation of Delaware
Filed Jan. 31, 1964, Ser. No. 341,598
1 Claim. (Cl. 85—61)

This invention relates to fasteners, and more particularly, it relates to a nut assembly for use in combination with a bolt which can be tightened in bolted assembly to a predetermined torque only.

A frequent problem arises with respect to the attainment of the desired torque on a nut and bolt assembly. Overtorquing frequently causes misalignment of the threaded engagement between the nut and bolt or results in structural failures in the nut or bolt or in the structure being fastened. Undertorquing results in such defects as loose connections and the need for frequent tightening of the assembly. Such torque level problems often require the purchase and use of a torque-resgistering type wrench to control the degree of torque applied to the bolted assembly. Such a torque wrench involves careful observation by the operator in order to apply the required torque.

The subject nut assembly has been conceived to eliminate the disadvantages associated with methods currently used for the attainment of the desired torque level on a bolted assembly. In general, the subject nut assembly comprises an annular inner portion having a threaded bore therethrough adapted to be received on a threaded bolt and an outer annular portion surrounding said inner portion and fixed relative thereto by means of a shear pin and adapted on its outer periphery to receive a suitable tool for applying torque to the assembly. The shear pin is selected such that its yield point under shearing load is equal to the desired torque load on the subject nut assembly so that the shear pin fractures when the desired torque load has been applied. This fracturing of the shear pin allows the outer portion to move relative to the inner portion thereby assuring the maintenance of the desired torque level on the inner portion. The inner and outer portions have axial openings on their adjoining surfaces which match to form a lock pin hole such that a lock pin can be inserted to fix the two portions relative to each other for the purpose of the removal of the nut assembly from the bolt.

It is therefore an object of this invention to provide a nut assembly which is adapted to be used in combination with a bolt and which can be tightened in bolted assembly to a predetermined torque level only.

It is another object of the subject invention to provide a simple means for the attainment of a desired torque level on a bolted assembly without the use of a torque measuring wrench.

It is a further object of the subject invention to provide a nut assembly which can be tightened to a predetermined torque level only and which can be prepared for its next use by merely inserting a new shear pin.

Other objects, features and advantages of the subject invention will become apparent upon reference to the succeeding detailed description and the drawings showing the preferred embodiment thereof, wherein.

Figure 1:
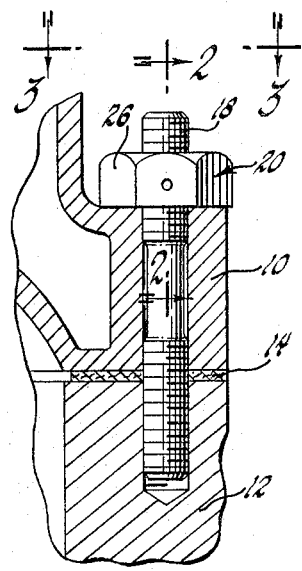
FIGURE 1 is a sectional view of the subject nut assembly used in combination with a bolt to fasten two members together.
Figure 2:
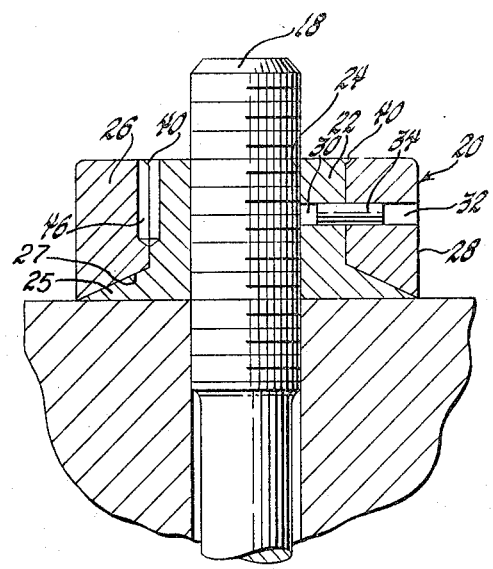
FIGURE 2 is an enlarged sectional view of the nut assembly taken in the direction of arrows 2—2 in FIGURE 1.
Figure 3:
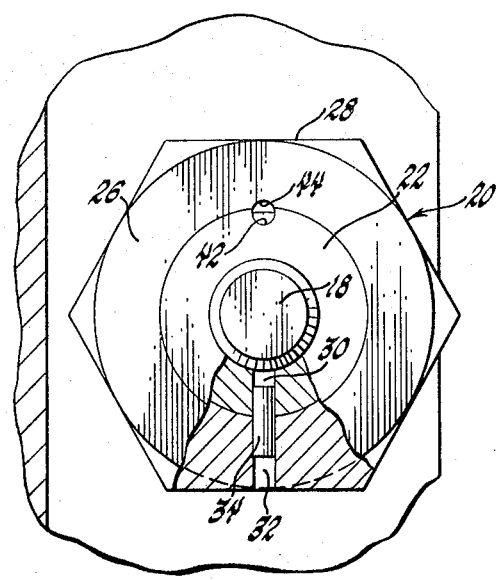
Figure 4:
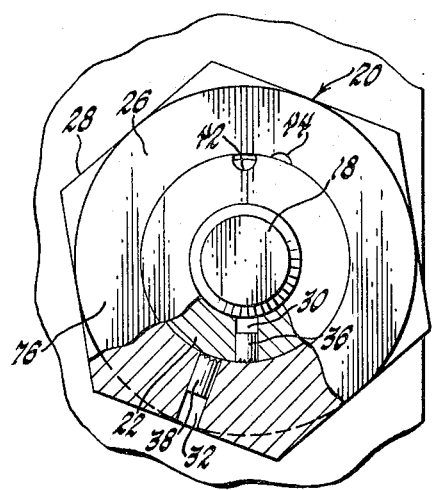

FIGURE 3 is an enlarged top view taken in the direction of arrows 3—3 in FIGURE 1 of the nut assembly with a portion cut away showing the shear pin connection between the inner and outer portions prior to the attainment of the required torque level; and FIGURE 4 is a top view similar to FIGURE 3 except that the cut-away portion shows the subject assembly after the required torque level has been attained and the shear pin fractured.

Although the preferred embodiment to be described shows the subject invention as applied to a hex head nut assembly used in combination with a threaded bolt to hold the cylinder head to the cylinder block in an internal combustion engine, it should be clear that the subject invention can be used in many other applications and should not be limited to the embodiment shown.

More particularly, FIGURE 1 shows the subject invention as applied to a bolted assembly holding two members 10 and 12 together. It should be clear that members 10 and 12 can be any two members that it is desired to have fixed together. For example, as shown in FIGURE 1, member 10 may be a cylinder head and member 12 a cylinder block of an internal combustion engine. Although not pertinent to the subject invention, a suitable gasket or seal 14 will be positioned between the cylinder head 10 and the cylinder block 12 in the embodiment shown in FIGURE 1. The subject invention is shown as a hex head nut assembly 20 threadedly received on a bolt 18. The bolt 18 may be of any suitable type which in this embodiment would be threadedly attached to the cylinder block 12 and will pass through the cylinder head 10 to be fixed thereto by the nut assembly 20. This application of the subject invention to a bolt connecting the cylinder head and cylinder block of an internal combustion engine was chosen because it is an excellent example of a situation where the amount of torque applied to the bolted assembly is critical.

The remaining discussion of the subject invention will be concentrated on the details of the nut assembly itself. The subject nut assembly 20 has an inner portion 22 with an axial bore 24 cut therethrough. The inner surface of this bore 24 is threaded so as to be able to threadingly receive the threaded bolt 18. The inner portion 22 terminates in annular inclined flange 25 at the end adjacent to the member 10. Located around the inner portion 22 in an outer annular portion 26 which has its outer periphery 28 formed into six equal sides so that it forms a hex head and is adapted to be turned by a suitable tightening tool, such as a wrench. Outer portion 26 terminates in an annular inclined surface 27 that is in mating engagement with flange 25 of inner portion 22. The inner portion 22 has a radial bore 30 formed therethrough to match up with a radial bore 32 in the outer portion 26. A shear pin 34 is inserted into the bore formed through the two portions by the alignment of the bores 30 and 32. This shear pin 34 fixes the inner and outer portions 22 and 26 together so that when the outer portion 26 is turned by a suitable tool, the two portions rotate together and can traverse the threaded stud 18. The shear pin 34 is selected such that the maximum shear load it can withstand is equal to the torque that is desired on the subject nut assembly. Hence it should be clear that the maximum torque which will be transmitted to the nut assembly will be a function of the material and size of the shear pin. Thus, when the desired torque level has been reached, the shear pin fractures and the connection between the inner and outer portions 22 and 26 is released, thereby allowing the outer portion 26 to rotate relative to the inner portion 22. This transition is best seen in FIGURES 3 and 4. It should be clear that when the pin 34 breaks, a segment 36 of it remains within the bore 30 in the inner portion 22 and a segment 38 remains in the bore 32 in the outer portion 26, and that the inner portion 22 remains in threaded engagement with the threaded bolt 18 at the predetermined torque level desired. It should be noted further that the inner portion 22 has a lip portion 40 which holds the outer portion 26 in assembly with the inner portion 22 as the surface 27 rotatably engages flange 25 after the pin 34 has fractured. This lip portion 40 prevents axial movement of the outer portion 26 with respect to the inner portion 22.

As seen in FIGURES 3 and 4, the inner and outer portions 22 and 26 have matching half bores 42 and 44 which align to form an axial bore 46 at the juncture of the inner and outer portions 22 and 26. The axial slot 46 is open to the top of the nut assembly; in other words, it is open to the side of the assembly furthest away from the member 10 against which the nut assembly 20 is tightened. This bore 46 formed when the inner and outer portions are aligned with each other provides a location for a lock pin to facilitate the removal of the nut assembly from the stud 18. In other words, after the shear pin 34 has fractured and it is desired to remove the nut assembly 20, a lock pin may be inserted within the bore 46 to connect the inner and outer portions 22 and 26 for rotational movement about the bolt 18 thereby facilitating the removal of the nut assembly 20 from the bolt 18. Once the nut assembly is removed, the lock pin and the fractured shear pin can be removed and a new shear pin inserted into the aligned radial bores 30 and 32 to place the nut assembly in condition for continued use. Thus, it can be seen that the subject nut assembly 20 can be made ready for use again by merely inserting a new shear pin into the radial bores 30 and 32.

Thus, the subject invention provides a nut assembly whereby a desired torque can be applied to the nut in a bolted assembly without the use of a torque wrench and without the difficulties arising from under- and overtorquing. The subject invention further presents such a nut assembly that is adapted for repeated used and suitable for many different applications. It should also be clear that the subject invention could easily be applied to the heads of bolts such that the head rotates about the shank upon the attainment of a desired torque.

Although the description of this invention has been given with respect to the use of a nut and bolt assembling a cylinder head to a cylinder block in an internal combustion engine, it should be obvious to those skilled in the art to which this invention pertains, that many changes and modifications may be made without departing from the scope of the invention.

I claim:

A nut assembly adapted to be used in combination with a bolt to result in a fastening means comprising:

an annular inner portion having a threaded axial bore therethrough adapted to threadedly receive said bolt, said inner portion having a radial bore formed into a portion thereof, a radially extending lip means at its upper axial extremity a smooth outer periphery and a radially extending inclined flange at its lower axial extremity adapted to engage a body to be fastened;

an outer portion having a cylindrictal bore receiving said annular inner portion, said outer portion further having an annular inclined surface engaging said inner portion inclined flange and being rotatably mounted thereon, the outer periphery of said outer portion being non-circular to receive a suitable tool for applying torque to said nut assembly, said outer portion having radial bore formed therethrough and adapted to be aligned with the radial bore in said inner portion, said outer portion being fixed in the axial direction relative to said inner portion between said lip means and said inclined flange on said inner portion;

a shear pin residing in the aligned radial bores in said inner and outer portions and fixing said portions relative to each other, said shear pin being selected to fracture at a given shear load resulting from the predeterminted torque applied to said outer portion thereby releasing the connection between said inner and outer portions and allowing said outer portion to rotate relative to said inner portion, and said inner and outer portions having a small axial segment removed thereby forming openings on the top of the assembly at the juncture of the inner and outer portions, said openings when aligned forming an axially extending slot adapted to receive a lock pin extending axially of said nut assembly for the purpose of connecting said inner and outer portions to facilitate the removal of said nut assembly from said bolt, said lock pin having sufficient shear strength to withstand the torque necessary to remove said nut from said bolt.

References Cited by the Examiner

UNITED STATES PATENTS

| 522,334 | 7/1894 | Zwigard | 85—32 |
| 1,097,484 | 5/1914 | Tulloch | 151—17 |
| 1,966,414 | 7/1934 | Main | 85—61 |
| 2,372,269 | 3/1945 | Golan | 85—32 |
| 3,191,486 | 6/1965 | Gibbens | 85—61 |

FOREIGN PATENTS

| 660,630 | 4/1963 | Canada. |
| 324,581 | 1/1930 | Great Britain. |

EDWARD C. ALLEN, *Primary Examiner.*